(12) United States Patent
Gallentine

(10) Patent No.: US 6,895,735 B2
(45) Date of Patent: May 24, 2005

(54) INSTANT MOUNT WHEELS FOR PORTABLE APPLIANCE

(76) Inventor: Bill Gallentine, 615 Country Club Rd., Hood River, OR (US) 97031

( * ) Notice: Subject to any disclaimer, the term of this patent is extended or adjusted under 35 U.S.C. 154(b) by 88 days.

(21) Appl. No.: 10/156,937

(22) Filed: May 30, 2002

(65) Prior Publication Data

US 2003/0221400 A1 Dec. 4, 2003

(51) Int. Cl.[7] .............................................. A01F 34/00
(52) U.S. Cl. ...................................... 56/12.7; 56/17.5
(58) Field of Search ............................... 56/12.7, 16.7, 56/17.5; 24/273; 30/276

(56) References Cited

U.S. PATENT DOCUMENTS

| | | | |
|---|---|---|---|
| 4,182,100 A | * | 1/1980 | Letter ........................... 56/16.7 |
| 4,688,376 A | * | 8/1987 | Wolfe, Sr. ...................... 56/16.7 |
| 4,704,849 A | | 11/1987 | Gilbert et al. |
| 4,914,899 A | * | 4/1990 | Carmine ....................... 56/16.7 |
| 4,936,886 A | | 6/1990 | Quillen |
| 5,092,112 A | | 3/1992 | Buckendorf, Jr. |
| 5,263,303 A | | 11/1993 | Stroud |
| 5,548,876 A | * | 8/1996 | Oetiker ......................... 24/271 |
| 5,836,142 A | | 11/1998 | Maxwell |
| 5,884,462 A | * | 3/1999 | Gerber ......................... 56/12.1 |
| 6,050,069 A | * | 4/2000 | Elensky ........................... 56/7 |

\* cited by examiner

*Primary Examiner*—Thomas B. Will
*Assistant Examiner*—Meredith Petravick

(57) ABSTRACT

A two wheeled carriage for converting a string trimmer to a wheeled appliance. The carriage has an axle, two nine inch or greater wheels, and a clamp for retaining the string trimmer's shaft. A swivel joint enables the clamp to adjust angular orientation of the appliance relative to the carriage. A latch locks the swivel joint in one of several angular orientations. The clamp includes an adjustable, flexible grasping element for engaging shafts of different dimensions and configurations. A lever operated over-center arrangement closes the grasping element over the appliance shaft. The clamp optionally includes saddles for securing that shaft in a fixed perpendicular and non-intersecting angular relationship to the axle. An adjuster varies deviation of that shaft from the horizontal. The adjustment mechanism may be located either between the axle and the swivel joint or alternatively between the swivel joint and the clamp.

18 Claims, 5 Drawing Sheets

INSTANT MOUNT WHEELS FOR PORTABLE APPLIANCE

REFERENCE TO RELATED APPLICATION

This application is related to U.S. patent application Ser. No. 09/576,046 filed May 23, 2000, now abandoned.

BACKGROUND OF THE INVENTION

1. Field of the Invention

The present invention relates to a wheeled carriage for converting a hand held appliance to a wheeled equivalent. More specifically, the wheeled carriage is quickly mounted to and disconnected from the appliance, so that the appliance is readily utilized either on its own or in wheeled form. The invention is used as an adjunct for hand held appliances, such as string trimmers, which have elongate handles. The invention is useful to homeowners and others charged with responsibility for using appliances such as string trimmers in maintaining residential, commercial, industrial, and institutional grounds and buildings.

2. Description of the Prior Art

Development of appliances such as grass trimmers having rapidly rotating filament blades, popularly known as string trimmers, have come into widespread use. The principal application of string trimmers is to cut small areas of tall grass and weeds to the level of surrounding grass. In particular, string trimmers are used at the borders of large expanses of grass wherein the border becomes irregular in configuration due to the presence of trees, lighting poles, fences, buildings, and other tall structures. String trimmers are also used to extend the reach of lawn mowers, such as along fences and buildings at ground level, and under overhanging foliage.

While string trimmers are convenient, practical, and generally suited to the aforementioned tasks, the burden they impose on a user becomes increasingly onerous over time. Unless the user is unusually strong, he or she will become fatigued and become unable to continue or will notice that control over the device is becoming tenuous as the trimmer is used. The prior art has taken note of this problem, and has proposed wheeled supports as a solution.

However, even wheeled string trimmers and like appliances are limited in their use in that the wheels dictate where the working element such as a rotating filament or a rigid blade may be brought to bear. This is because the appliance can be pivoted about the axle, but cannot be adjusted or maneuvered readily in other ways (i.e., adjustment of prior art devices is limited to one degree of freedom). Usefulness of wheeled appliances would be greatly increased if additional adjustment and maneuverability were available. The prior art is not seen to describe the instant invention as claimed.

SUMMARY OF THE INVENTION

The present invention sets forth a two wheeled carriage for supporting an appliance such as a string trimmer by the shaft of the trimmer. A significant improvement over the prior art is that maneuvering and adjustment are provided for in ways other than by pivoting the appliance about the rotational axis of the axle. One such adjustment is that the appliance may be oriented on the wheeled carriage such that the working element may be rotated to project to either the right or left side of the appliance. This enables the appliance to be wheeled along its path with cutting taking place selectively to the right or the left beyond the wheels. In prior art devices, cutting takes place in front of and between the wheels. The novel improvement is used, for example, to trim below the lowermost rail of a rail fence and in other places wherein the wheels are obstructed. This angular adjustment can be further modified by inclining the appliance about the axle, thereby cutting at levels higher than that of the environmental surface on which the wheels rest. For example, a flower bed abutting an adjacent walkway may have a grade level above that of the walkway. This bed may be trimmed while propelling the appliance along the walkway.

Other adjustments vary deviation of the shaft of the appliance from the horizontal direction. These adjustments enable the handle to be located for ergonometric convenience. The prior art practice of inclining a trimmer and wheel assembly by raising and lowering the handle to vary height of the working element above the ground may cause weight distribution and handle position to become awkward, uncomfortable, and inefficient. The deviational adjustments address these shortcomings. Deviational adjustments in the present invention may also be made so that the rotating filament or other working element impinges upon the ground vertically. When adjusted to this degree, the appliance may take on additional capabilities, such as a string trimmer being utilized as an edger, while still balancing the appliance over the axle of the auxiliary carriage.

The carriage grasps the shaft of the trimmer in one embodiment by an encircling clamp tightened by an over-center arrangement. This feature provides positive grasp of the shaft, while eliminating fasteners which could become lost and which may require tools to tighten. It also can be fastened and unfastened in seconds, which makes it highly practical to convert between the wheeled and unwheeled configurations.

Accordingly, it is one object of the invention to overcome shortcomings and to expand upon abilities of the prior art.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
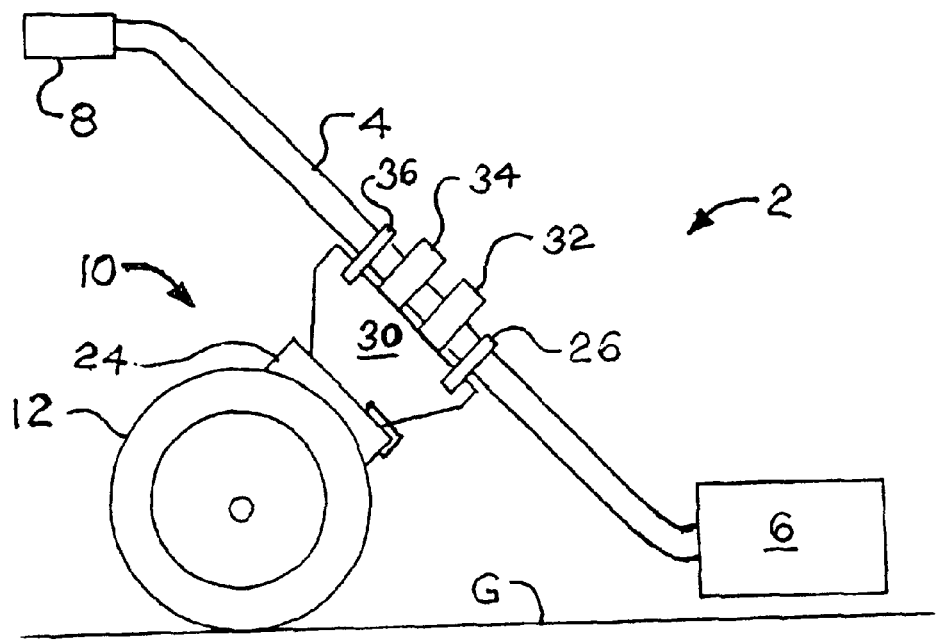
FIG. 1 is a diagrammatic environmental, side elevational view of an embodiment of the invention.

FIG. 1 of the drawings shows wheeled carriage 10 engaging and supporting an appliance such as string trimmer 2 having an elongate shaft 4. String trimmer 2 is shown in an operative position relative to both carriage 10 and the ground G. In this position, working head 6 of string trimmer 2 is located just above ground G, thereby enabling a rotatable filament or other blade (neither shown) to cut grass and other vegetation just above ground level. Handle 8 of string trimmer 2 is located roughly at the waist level of an adult (not shown). This is a convenient and ergonomically suitable location and orientation of handle 8. String trimmer 2 will be understood to be representative of any conventional type of trimmer having a rotatable filament or other blade, encompassing both electrically operated and also those having onboard internal combustion engines. Although trimmers may vary in configuration, weight distribution, center of gravity, and in other ways, a great variety of trimmers and other appliances are accommodated by the present invention, as will become apparent.

Figure 2:
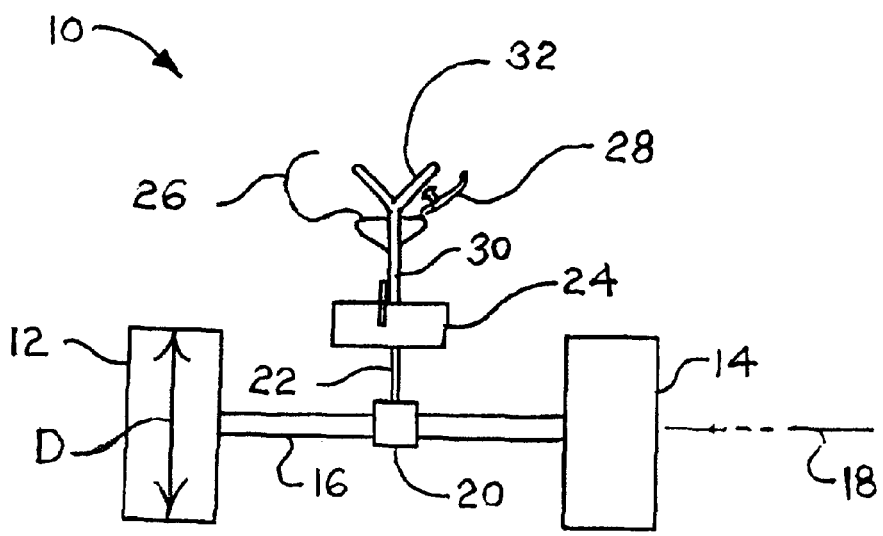
FIG. 2 is a front elevational view of the embodiment of FIG. 1.

Referring also to FIG. 2, carriage 10 has two wheels 12, 14 which rest on ground G in the operative position. Wheels 12, 14 are each mounted on an axle 16 enabling rotation about a rotational axis 18. In an embodiment especially suited for care of ordinary lawns and turf, wheels 12, 14 have a minimum diameter D of at least nine inches. This dimension assures that wheels 12, 14 will resist binding and changing of steering direction when negotiating minor variations in turf surfaces which are normally encountered in lawns.

A clamp, which will be described hereinafter, is mounted to axle 16 in a manner such that it remains in a constant position when wheels 12, 14 rotate about rotational axis 18. This may be accomplished by fixing wheels 12, 14 to axle 16 and supporting axle 16 at a bearing 20. Alternatively, wheels 12, 14 may be arranged to rotate on axle 16. Regardless of the rotational arrangement of wheels 12, 14, the clamp is disposed to receive and retain elongate shaft 4 of the appliance releasably to wheeled carriage 10.

A rigid plate 22 projects upwardly relative to the operative position from bearing 20. A swivel joint 24 mounted to plate 22 is disposed to adjust angular orientation of the clamp relative to rotational axis 18 of axle 16. This is accomplished by mounting the clamp above swivel joint 24. Swivel joint 24 may take any suitable form.

The clamp comprises any suitable grasping element arranged to secure elongate shaft 4 of string trimmer 2. In the preferred embodiment, the grasping element comprises a flexible strap 26 capable of conforming to shafts of different configurations and dimensions, and an adjustable connector 28 disposed to connect to strap 26 and to tighten strap 26 over shaft 4 as shown in FIG. 1. In the embodiment of FIG. 1, the grasping element encircles shaft 4. While encirclement is not absolutely necessary, it is desirable as providing secure engagement of shaft 4. As seen in FIG. 1, two generally identical grasping elements are provided.

The grasping elements are supported on a plate 30 which projects upwardly from swivel joint 24. Plate 30 has fixed thereto a first saddle 32 and a second saddle 34 disposed in fixed relation to rotational axis 18 of axle 16. Saddles 32, 34 are disposed to receive shaft 4 and hold shaft 4 at a fixed distance in relation to rotational axis 18 when shaft 4 is urged firmly against saddles 32, 34 by tightening of strap 26 of one grasping element and strap 36 of the second grasping element. In the embodiment of FIG. 1, saddles 32, 34 are spaced apart from one another. This better resists moments which may be applied when a human operator maneuvers the mounted string trimmer by handle 8. Of course, more than two saddles may be provided. Also, one long, continuous saddle may be provided to assure secure mounting of shaft 4 to carriage 10. Regardless of the number of saddles, a saddle or saddles are oriented such that shaft 4 of the trimmer is secured by the clamp in perpendicular and non-intersecting relationship to axle 16.

Figure 3:
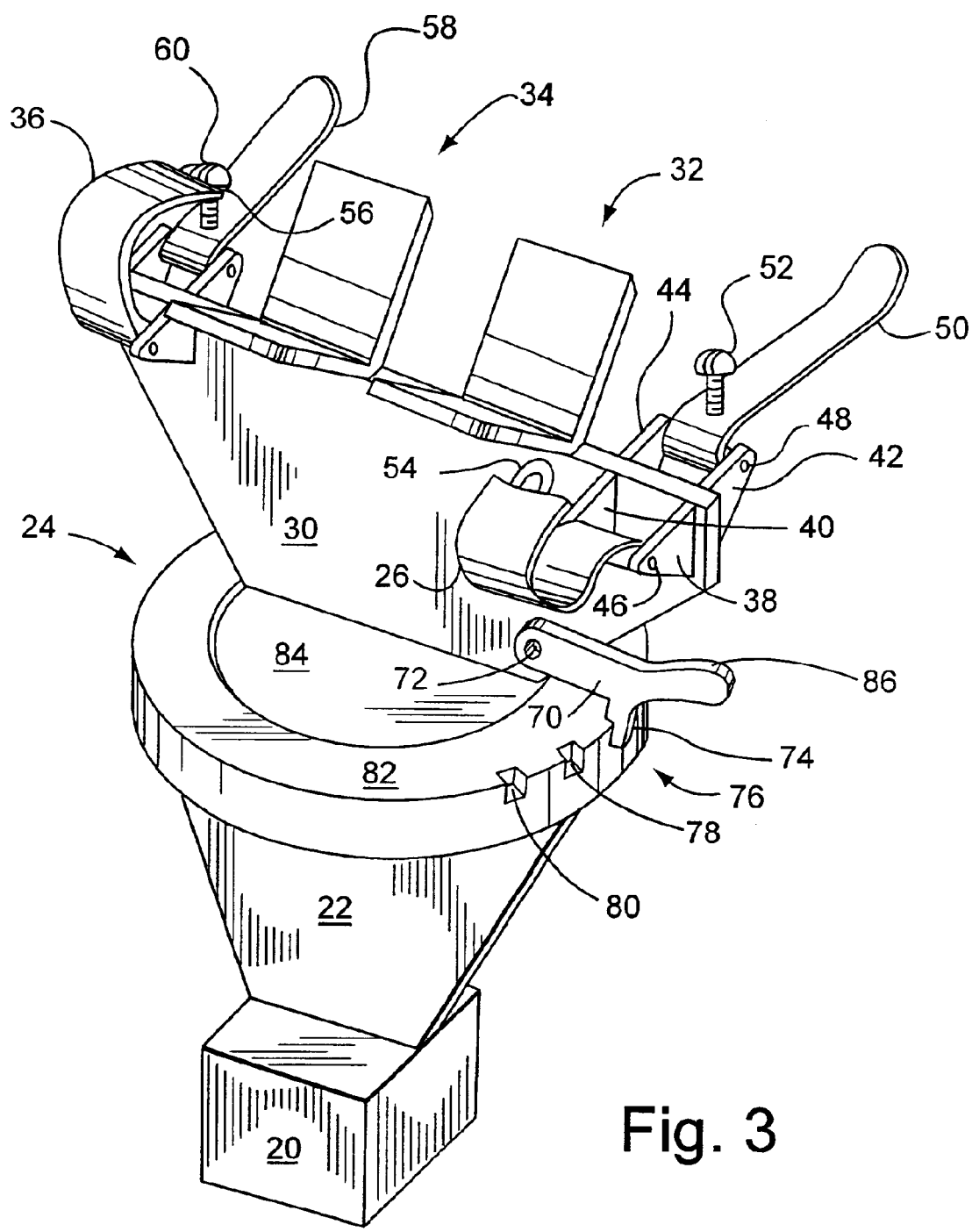
FIG. 3 is an enlarged perspective detail view of the upper part of FIG. 2.

Turning now to FIG. 3, the clamp is more particularly described. Each grasping element is supported at plate 30 by two rigid webs. The grasping element at the right of FIG. 3 includes webs 38, 40 and 42, 44. A pin 46 is fixed at its two ends to webs 38, 40. Strap 26 is anchored at pin 46 at its proximal end. Similarly, a pin 48 is fixed at its two ends to webs 42, 44. A lever 50 is pivotally mounted on pin 48. A threaded fastener such as screw 52 serves as a connector which is threadably and adjustably fixed to carriage 10. Strap 26 and lever 50 are complementary closing members which mutually interengage to entrap shaft 4 and secure strap 4 to carriage 10. Saddles 32, 34, which are seen in FIG. 3 each to comprise a vee-shaped trough, provide a secure seat for receiving shaft 4. Shaft 4 is secured to carriage 10 when clamped against saddles 32, 34. It would be possible to eliminate saddles 32, 34 and to cause the clamp elements to retain shaft 4 directly thereto if desired.

Strap 26 bears at its free distal end an eye 54 which is dimensioned and configured to engage and retain the threaded shaft of screw 52 when the shaft is passed through eye 54. Threading screw 52 into lever 50 reduces the operable circumference which can be encircled by lever 50 and strap 26. This provides adjustment for accommodating shafts of different dimensions. The flexible nature of strap 26 accommodates shafts of different outer configurations, where such shafts may depart from circular or tubular configurations.

Lever 50 is arranged in an over-center arrangement such that pressing the free end of lever downwardly, as depicted in FIG. 3, will cause the head of screw 52 to urge eye 54 into increasingly tight engagement with lever 50, thereby securing the clamp in a closed position. The over-center arrangement assists in opposing spontaneous release of shaft 4.

The second grasping element located at the left of FIG. 3 is essentially identical to that at the right of FIG. 3. The second grasping element includes flexible strap 36 bearing an eye 56, and a lever 58 having a screw 60. Whereas the first grasping element is depicted with strap 26 disconnected from lever 50, the second grasping element is depicted with its corresponding strap 36 disposed in engagement with screw 60 of corresponding lever 58. Locations of saddles 32, 34 may be interchanged with those of the first and second grasping elements of the clamp if desired. An advantage of providing two saddles 32, 34 and two corresponding straps 26, 36 is to accommodate some appliances (not shown) which are so arranged that structure such as motor housings must be mounted to a saddle 32 or 34 for the appliance to be balanced on carriage 10, or to be positioned for effective reach and location of its working head. Many electric string trimmers are configured such that their housings must be mounted to upper saddle 34 (as depicted in FIG. 1). Provision of two straps 26, 36 spaced apart from one another along the length of a shaft of an appliance such as an electric string trimmer enables the shaft and housing of the electric string trimmer each to be encircled and firmly secured to carriage 10 despite different circumferences and configurations.

Figure 4:
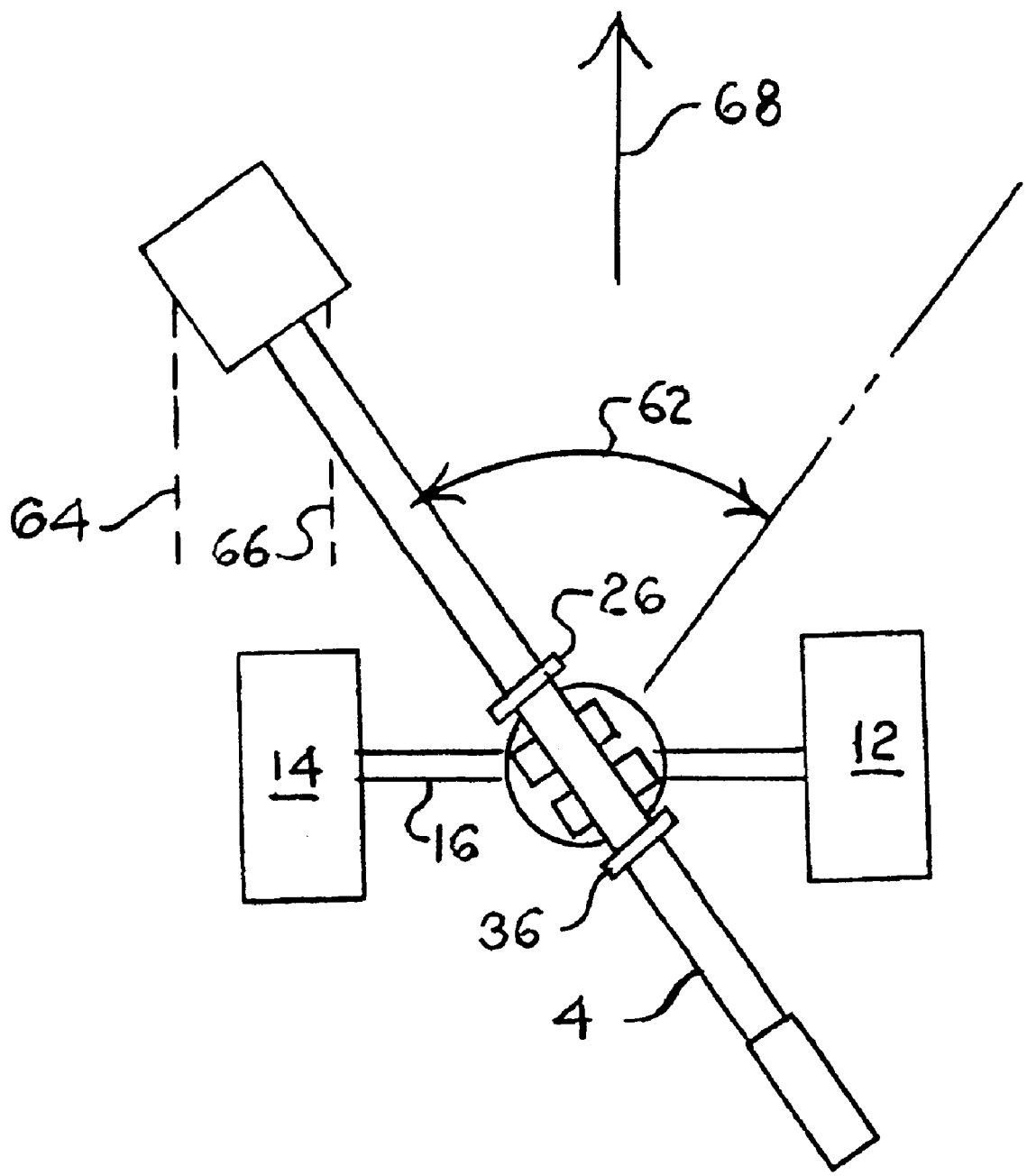
FIG. 4 is a diagrammatic, top plan view of the embodiment of FIG. 1.

FIG. 4 shows how angular orientation of the clamp may be varied with respect to the rotational axis of axle 16. As shown in FIG. 4, the azimuth of the longitudinal axis of shaft 4 (see FIG. 1) can be adjusted throughout an angle 62.

Magnitude of angle 62 may be limited by stops (not shown), or alternatively may extend to three hundred sixty degrees if interference of shaft 4 with other objects such as wheels 12, 14 is avoided. Variable angular orientation of the clamp provides ability to cut to one side of carriage 10 while propelling carriage 10 alongside of and parallel to the swath of the cut. In FIG. 4, the swath of the cut is that area between broken lines 64 and 66. Forward motion of carriage 10 is indicated by arrow 68.

Returning to FIG. 3, carriage 10 is seen to include a latch disposed to lock plate of swivel joint 24, and-therefore saddles 32, 34 and the clamp selectively and releasably in any one of a plurality of positions of angular orientation of the clamp to rotational axis 18 of axle 16. The latch comprises a swing arm 70 pivotally mounted to plate 30 on a pin 72. Arm 70 includes a downwardly projecting finger 74 which can enter any one of a plurality of notches 76, 78, 80 formed in an upper wall 82 of swivel joint 24. Number, spacing, and magnitude of the angle of the array of notches may be varied to suit. Finger 74 may be retained in a notch by gravity or optionally by spring bias or mechanical entrapment.

In the embodiment of FIG. 3, plate 30 is fixed to a plate 84 which is rotatably entrapped within swivel joint 24. Therefore, when plate 22 and wall 82 remain in one position, plate 30, saddles 32, 34, and the clamp are free to rotate about a vertical axis, as depicted in FIG. 3. Azimuth of shaft 4 (see FIG. 1) rotates accordingly, as seen in FIG. 4. Arm 70 preferably includes a handle 86 for conveniently grasping and lifting arm 70 when finger 74 engages any notch 76, 78, or 80.

Figure 5:
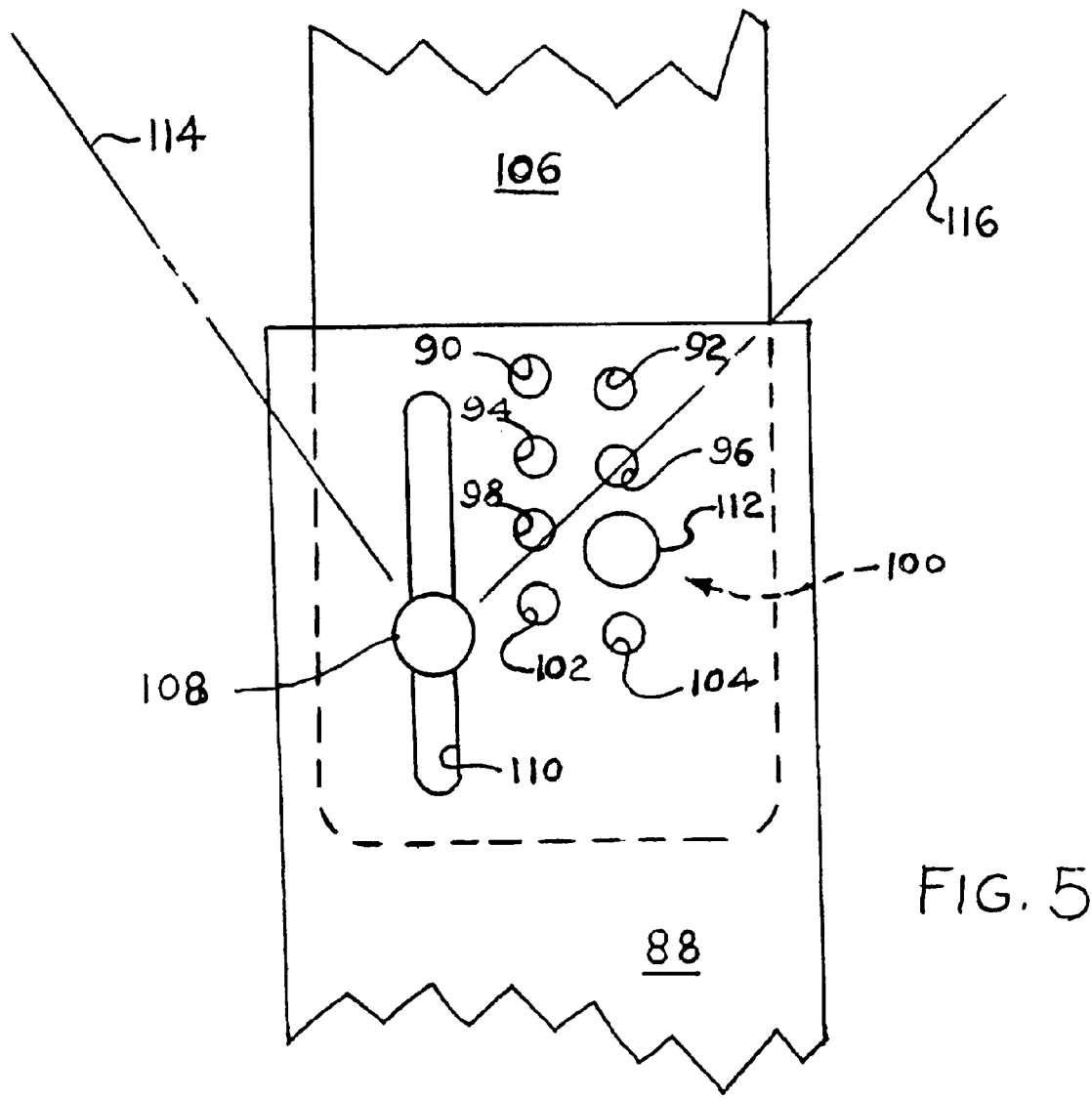
FIG. 5 is an enlarged side elevational detail view of an optional adjustment feature not shown in the previous Figures.

Turning now to FIG. 5, carriage 10 optionally includes an elevational angle adjuster disposed to vary angular orientation of the clamp and of shaft 4 with respect to a horizontal direction selectively when the clamp is prevented from pivoting ineffectually about axis 18, when axle 16 remains horizontally oriented. An adjustable joint as shown in FIG. 5 may be interposed at any suitable point between axle 16 and the clamp to effect this adjustment.

The adjustable joint comprises a first member such as plate 88 bearing adjustment holes 90, 92, 94, 96, 98, 100, 102, 104, and a second member such as plate 106 bearing a plurality of alignable adjustment holes which in the depiction of FIG. 5 are aligned with and thus exactly overlie holes 90, 92, 94, 96, 98, 100, 102, 104 and therefore are not visible in FIG. 5. A fastener such as bolt 108 passes through an elongated adjustment slot 110 and a corresponding adjustment hole (not visible) formed in plate 106. A second fastener such as bolt 112 passes through adjustment hole 100 of plate 88 and an aligned corresponding hole (not visible) formed in plate 106. Bolts 108 and 112 will be understood to include threadably mating nuts (not separately shown). Plate 106 is therefore adjustably secured to plate 88. Although only two fasteners 108, 112 are shown, it would be possible to utilize additional fasteners (not shown) for greater security if desired.

It is possible to vary angular position of plate 106 with respect to plate 88 by rotating plate 106 about the center of bolt 108, until an adjustment hole formed in plate 106 which is different from that aligned with hole 100 aligns with an adjustment hole 90, 92, 94, 96, 98, 100, 102, or 104 of plate 88. This angular variation is indicated by projection lines 114, 116. It must be recognized that lines 114, 116 are illustrative only and do not limit or define the extent of angular adjustment of plate 106. It is preferred that angular adjustment of plate 106 be sufficient to enable string trimmer 2 to be utilized as an edger, with its rotatable filament positioned to form a generally vertical trench in the ground.

It will also be seen that the nature of slot 110, taken together with location and spacing of adjustment holes formed in plate 106, enable the adjustment joint to act as a height adjuster disposed to vary height of the clamp selectively with respect to axle 16. This is accomplished by slackening the nut of bolt 108, moving plate 106 vertically upwardly or downwardly, as depicted in FIG. 5, and reinstalling and tightening the nut of bolt 108 and the nut of bolt 112, with bolt 112 being relocated appropriately in different adjustment holes.

The adjustable joint of FIG. 5 may be located between axle 16 and swivel joint 24, formed as part of swivel joint 24, or may be located between swivel joint 24 and the clamp. Least complicated construction will result when either of plate 22 and plate 30 is modified to include the adjustable joint of FIG. 5. If plate 22 is so modified, then one member of the adjustable joint is secured to axle 16. If plate 30 is so modified, then one member is secured to the clamp.

It will be appreciated that separate adjustment holes 90, 92, 94, 96, 98, 100, 102, 104 may be eliminated in favor of a single elongate arcuate slot (not shown) corresponding in nature to slot 110 if desired. It would also be possible to modify the joint of FIG. 5 to provide only vertical adjustment or only angular adjustment if desired.

Swivel joint 24, the elevational angle adjuster, and the height adjuster, taken individually or in any combination, serve as an orientation adjuster which enables selective adjustment of location and orientation of the working head of the appliance with respect to the ground, with axle 16 being maintained in a constant orientation with respect to the ground.

Figure 6:
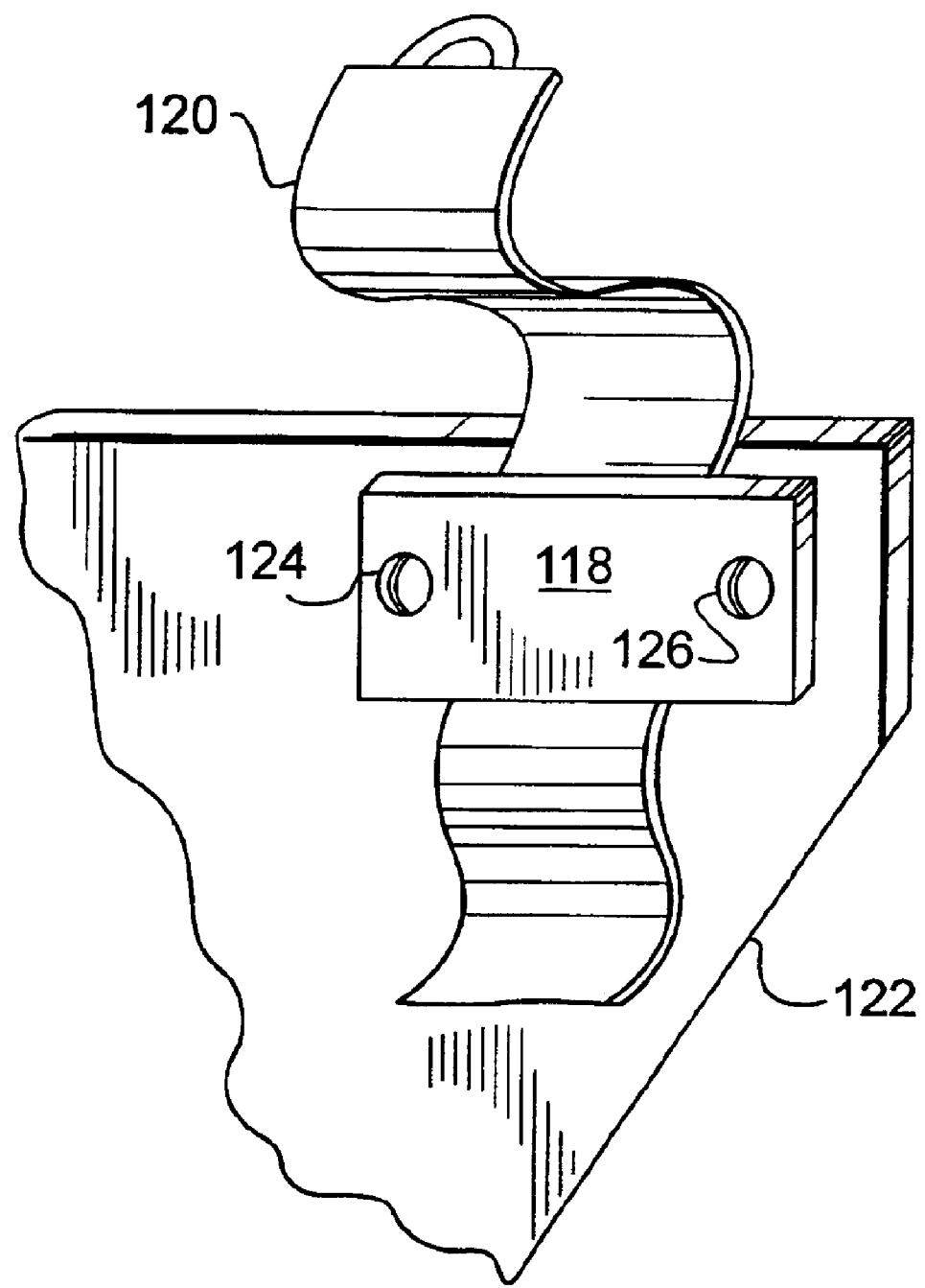
FIG. 6 is a side elevational detail view of an alternative embodiment of the invention depicting a modification to the upper right of FIG. 3.

FIG. 6 shows an alternative embodiment of the invention wherein an optional feature allows for coarse adjustment of the effective length of straps corresponding to straps 26 and 36 of FIG. 3. A keeper 118 releasably clamps the free end of strap 120 to plate 122, which plate 122 corresponds functionally to plate 30 of FIG. 3. Keeper 118 may be released from the clamping position by slackening screws 124, 126. Effective length of strap 120 is adjusted according to the circumference it must envelop, this referring to the shaft or housing of the appliance being fastened. Keeper 118 is then tightened to plate 122 using screws 124, 126, with strap 120 now clamped in a new adjusted position. This embodiment is an alternative to fixed anchorage of straps 26, 36 shown in FIG. 3.

A second keeper and a second strap (not show) formed essentially as a mirror image of keeper 118 and strap 120 are preferably provided, and are located in a manner similar to that of straps 26 and 36 of FIG. 3. Adjustment corresponding to adjustment of screw 60 and engagement of the straps of the embodiment of FIG. 6 of an appliance may be essentially similar to those of FIG. 5. Keeper 118 may be hinged (this is not shown) or otherwise operably attached to plate 122 if desired. Screws 124, 126 may be replaced by a latch (not shown) or other apparatus to facilitate operation and to eliminate threat of loss of small parts if desired.

The present invention is susceptible to further variations and modifications which may be introduced without departing from the inventive concept. Carriage 10 may, for example, include suitable braces and gussets (not shown), disposed to oppose bending of plates 22, 30 and other members, or to reinforce any member. Saddles 32, 34 may be configured other than as vee-shaped. For example, saddles (not shown) may be semi-circular or have flat bottoms.

Appliances utilized with the novel carriage may be other than a string trimmer. For example, the appliance may be a torch, vacuum device, hand held blower, fluid spraying or dispensing device such as a paint gun or a device for dispensing solvents, lubricants, adhesives, pesticides, herbicides, protective chemicals such as fire retardants and water resistant substances, or still others.

It is to be understood that the present invention is not limited to the embodiments described above, but encompasses any and all embodiments within the scope of the following claims.

I claim:

1. A wheeled carriage for engaging and supporting an appliance having an elongated shaft, comprising:

an axle having a rotational axis, a first wheel mounted to said axle in a manner enabling rotation about said rotational axis, and a second wheel mounted to said axle in a manner enabling rotation about said rotational axis;

a clamp mounted to said axle and disposed to remain in a constant position when said first wheel and said second wheel rotate about said rotational axis, and disposed to receive and retain an elongated shaft of an appliance releasably to said wheeled carriage, said clamp adapted to grasp said elongated shaft of said appliance only at a single region proximate a midpoint along a length of said shaft, said clamp including a first closing member, a second closing member bearing an eye disposed to adjustably engage said first closing member, and an over-center arrangement disposed to draw said eye into engagement with said first closing member, thereby securing said clamp in a closed position, wherein said over-center arrangement includes a lever pivotally mounted on said clamp at a location such that when said lever is pivoted, said eye is drawn into increasingly tight engagement with said first closing member; and an orientation adjuster disposed to selectively position said clamp in different orientations relative to said axle.

2. The wheeled carriage according to claim 1, wherein said orientation adjuster comprises a swivel joint disposed to adjust angular orientation of said clamp relative to said rotational axis of said axle.

3. The wheeled carriage according to claim 1, wherein said second closing member has an adjustable grasping element arranged to encircle and secure an elongated shaft having one of several different dimensions.

4. The wheeled carriage according to claim 3, wherein said adjustable grasping element comprises a first flexible strap capable of selectively conforming to an elongated shaft having one of several different configurations.

5. The wheeled carriage according to claim 4, further comprising a first strap keeper disposed to vary effective length of said first flexible strap.

6. The wheeled carriage according to claim 1, wherein said second closing member includes a flexible strap having a proximal end fixed to said clamp, and a free distal end bearing said eye.

7. The wheeled carriage according to claim 1, wherein said wheels have a minimum diameter of nine inches.

8. The wheeled carriage according to claim 2, further including a latch disposed to lock said swivel joint selectively and releasably in any one of a plurality of positions of angular orientation of said clamp to said rotational axis of said axle.

9. The wheeled carriage according to claim 1, further comprising a first saddle disposed in fixed relation to said rotational axis of said axle and disposed to receive a shaft of an appliance and hold the shaft in a fixed relation to said rotational axis of said axle when the shaft is urged firmly against said first saddle.

10. The wheeled carriage according to claim 9, further comprising a second saddle proximate and spaced apart from said first saddle, wherein said second saddle is disposed in fixed relation to said rotational axis of said axle and disposed to receive a shaft of an appliance and hold the shaft in fixed angular relation to said rotational axis of said axle when the shaft is urged firmly against said first saddle and said second saddle, both said first and said second saddles being located proximate a substantially central region of said shaft of said appliance.

11. The wheeled carriage according to claim 10, wherein said first saddle and said second saddle are oriented such that the elongated shaft of the trimmer is secured by said clamp in substantially perpendicular and non-intersecting relationship to said axle.

12. The wheeled carriage according to claim 1, wherein said orientation adjuster comprises an elevational angle adjuster disposed to vary angular orientation of said clamp with respect to a horizontal direction selectively when said clamp is prevented from pivoting about said rotational axis of said axle and said axle is horizontally oriented.

13. The wheeled carriage according to claim 12, wherein said elevational angle adjuster comprises:

a first member secured to said axle and bearing at least two adjustment holes, a second member bearing at least two adjustment holes alignable with said adjustment holes of said first member, wherein said swivel joint is mounted to said second member, and fasteners disposed to pass through said adjustment holes of said first member and of said second member when said adjustment holes of said first member and of said second member are aligned, and to secure said first member adjustably to said second member.

14. The wheeled carriage according to claim 12, wherein said elevational angle adjuster comprises a first member secured to said swivel joint and bearing at least two adjustment holes, a second member bearing at least two adjustment holes alignable with said adjustment holes of said first member, wherein said clamp is mounted to said second member, and fasteners disposed to pass through said adjustment holes of said first member and of said second member when said adjustment holes of said first member and of said second member are aligned, and to secure said first member adjustably to said second member.

15. The wheeled carriage according to claim 1, wherein said orientation adjuster comprises a height adjuster disposed to vary height of said clamp selectively with respect to said axle.

16. The wheeled carriage according to claim 1, wherein said orientation adjuster includes both a swivel joint and also an elevational angle adjuster.

17. The wheeled carriage according to claim 1, wherein said orientation adjuster includes both a swivel joint and also a height adjuster.

18. The wheeled carriage according to claim 1, wherein said orientation adjuster includes both an elevational angle adjuster and also a height adjuster.

* * * * *